United States Patent
Itabashi et al.

(10) Patent No.: US 8,038,921 B2
(45) Date of Patent: Oct. 18, 2011

(54) PROCESS FOR PRODUCING MOLDED OBJECT WITH EMBEDDED MEMBER

(75) Inventors: Yoshifumi Itabashi, Tokyo (JP); Yoshihiro Jizo, Tokyo (JP); Akihiro Fujita, Tokyo (JP); Keizou Yoshikawa, Aichi (JP); Tsuyoshi Fujimoto, Aichi (JP); Hiromori Ishihara, Aichi (JP); Nobuhiko Mizuno, Aichi (JP); Futoshi Yonekawa, Chiba (JP); Tomomi Hasegawa, Chiba (JP)

(73) Assignees: Mitsubishi Electric Corporation, Chiyoda-Ku, Tokyo (JP); Central Japan Rail Way Company, Nagoya-Shi, Aichi (JP); Idemitsu Kosan Co., Ltd., Chiyoda-Ku, Tokyo (JP)

( * ) Notice: Subject to any disclaimer, the term of this patent is extended or adjusted under 35 U.S.C. 154(b) by 226 days.

(21) Appl. No.: 11/918,972

(22) PCT Filed: Sep. 13, 2005

(86) PCT No.: PCT/JP2005/016797
§ 371 (c)(1),
(2), (4) Date: Oct. 22, 2007

(87) PCT Pub. No.: WO2006/114903
PCT Pub. Date: Nov. 2, 2006

(65) Prior Publication Data
US 2009/0115106 A1    May 7, 2009

(30) Foreign Application Priority Data
Apr. 22, 2005 (JP) ................. 2005-125390

(51) Int. Cl.
*B29C 45/14* (2006.01)

(52) U.S. Cl. ...................... 264/278; 473/351

(58) Field of Classification Search .............. 264/278; 473/351
See application file for complete search history.

(56) References Cited

U.S. PATENT DOCUMENTS
3,670,071 A * 6/1972 Walchle et al. ............ 264/273
3,931,847 A * 1/1976 Terkelsen .................. 164/458
(Continued)

FOREIGN PATENT DOCUMENTS
JP        6-37130 A      2/1994
(Continued)

OTHER PUBLICATIONS
International Search Report for PCT/JP2005/016797 dated Nov. 8, 2005.

*Primary Examiner* — Yogendra Gupta
*Assistant Examiner* — John Robitaille
(74) *Attorney, Agent, or Firm* — Buchanan Ingersoll & Rooney PC

(57) ABSTRACT

A process for producing a molding having an embedded member which comprises: a first step in which a mold (1) having pins (3) which extend from the outside to the inside of the mold and can be withdrawn outward is heated to a given temperature; a second step in which a member (2) to be embedded is held in a given position within the mold by supporting the member, including an upper part thereof, with the pins (3); a third step in which a thermoplastic resin is packed through a gate (1d) first into that part of the cavity of the mold (1) which is located under the member to be embedded to thereby cause the thermoplastic resin to press the member against the pin (3) located in an upper part of the mold; a fourth step in which the thermoplastic resin is packed into the remaining part of the cavity of the mold (1); and a fifth step in which the pins (3) are withdrawn successively from the lower side of the mold before cooling to a temperature at which the thermoplastic resin solidifies and loses its flowability.

8 Claims, 6 Drawing Sheets

U.S. PATENT DOCUMENTS

| | | | | |
|---|---|---|---|---|
| 5,240,397 | A | * | 8/1993 | Fay et al. .................... 425/145 |
| 6,131,267 | A | * | 10/2000 | Van Den Berg ............... 29/595 |
| 6,645,416 | B2 | * | 11/2003 | Bock et al. ................... 264/275 |
| 2002/0096801 | A1 | * | 7/2002 | Puniello et al. ............... 264/278 |
| 2002/0135101 | A1 | * | 9/2002 | Onoue et al. ................. 264/278 |
| 2004/0012122 | A1 | * | 1/2004 | Nagaoka et al. ........... 264/328.7 |

FOREIGN PATENT DOCUMENTS

| | | |
|---|---|---|
| JP | 10-258442 A | 9/1998 |
| JP | 10-315267 A | 12/1998 |
| JP | 2002-44916 A | 2/2002 |
| JP | 2002-225091 A | 8/2002 |

* cited by examiner

PROCESS FOR PRODUCING MOLDED OBJECT WITH EMBEDDED MEMBER

TECHNICAL FIELD

This invention relates to a process for producing a molded object with an embedded member, in which a member to-be-embedded is located within a thermoplastic resin.

BACKGROUND ART

A prior-art process for producing a molded object with an embedded member is such that a wound coil being a member to-be-embedded is located within a mold, and that the coil is supported by filling up the interspace between the inner surface of the mold and the coil, with a reinforcement mat. In addition, a reaction solution for performing reaction injection molding is supplied, and it is subjected to a polymerization reaction within the mold (refer to, for example, Patent Document 1).
Patent Document 1: JP-A-10-315267 (page 3, FIG. 2)

DISCLOSURE OF THE INVENTION

Problem that the Invention is to Solve

In the prior-art process for producing a molded object with an embedded member, the coil being the member to-be-embedded is supported by the reinforcement mat located inside the mold, and hence, there has been the problem that the placement of the reinforcement mat is troublesome.

This invention has been made in order to solve the problem as stated above, and it has for its object to provide a process for producing a molded object with an embedded member, in which a member to-be-embedded can be easily supported.

Means for Solving the Problem

A process for producing a molded object with an embedded member according to this invention is performed by a first step of heating to a given temperature, a mold which is formed with a gate capable of packing a thermoplastic resin therethrough, and in which a plurality of pins extending from the outside to the inside of the mold are withdrawable outward; a second step of supporting a member to-be-embedded, including an upper part side thereof, with the pins, so as to hold the member to-be-embedded at a given position within the mold; a third step of packing the thermoplastic resin from the gate into the mold on a lower part side of the member to-be-embedded earlier, so as to press the member to-be-embedded against the pin on an upper part side of the mold, with the thermoplastic resin; a fourth step of packing the thermoplastic resin into the remaining part within the mold; and a fifth step of withdrawing the pins successively from a lower part side of the mold, before the thermoplastic resin cools down to a temperature at which it solidifies and loses its flowability.

ADVANTAGE OF THE INVENTION

This invention consists in that a member to-be-embedded is held at a given position within a mold, with pins, that a thermoplastic resin is packed from the lower part side of the member to-be-embedded into the mold earlier, so as to press the member to-be-embedded against the pin on the upper part side of the mold, and that the pins are withdrawn successively from the pin on the lower part side of the mold, before the thermoplastic resin cools down to a temperature at which it solidifies and loses its flowability, whereby the support of the member to-be-embedded can be easily performed.

BEST MODE FOR CARRYING OUT THE INVENTION

Embodiment 1

FIG. 1 is a plan view showing a molded object with an embedded member produced by Embodiment 1 of this invention, FIG. 2 is a sectional view taken along line II-II in FIG. 1, FIG. 3 is a sectional view taken along line III-III in FIG. 1, FIG. 4 is an explanatory view showing the internal state of a mold at a part which corresponds to the section of the line II-II in FIG. 1, and FIG. 5 is an explanatory view showing the internal state of the mold at a part which corresponds to the section of the line III-III in FIG. 1.

Referring to FIGS. 1 to 5, a member to-be-embedded 2 formed of a coiled member is located in the cavity 1c of a mold 1 which is constituted by splittable split members 1a and 1b. As shown in FIG. 4, the lower part of the mold 1 is formed with a gate 1d which is capable of packing a thermoplastic resin therethrough. A plurality of pins 3 which extend from the outside to the inside of the mold 1 are withdrawably located on upper and lower, and right and left sides, including the upper part of the mold 1. The member to-be-embedded 2 is supported by the pins 3 including the pin located at the upper part of the mold 1, through protectors 4 made of insulating members, thereby to be held at a given position within the cavity 1c of the mold 1. The individual pins 3 supporting the member to-be-embedded 2 are fixed by fixation means not shown.

Next, a process for producing a molded object with an embedded member will be described. Referring to FIGS. 1 to 5, as a first step, a mold 1 is heated to a given temperature, and a member to-be-embedded 2 is located within a cavity 1c. Subsequently, as a second step, the member to-be-embedded 2, including the upper part side thereof, is supported with upper and lower, and right and left pins 3, so as to hold the member to-be-embedded 2 at a given position within the cavity 1c. Subsequently, as a third step, a thermoplastic resin at a given temperature is packed through a gate 1d located on the lower part side of the member to-be-embedded 2, into the cavity 1c of the mold 1 under a given injection pressure. Here, the member to-be-embedded 2 is pressed against the pin 3 located on the upper part side of the mold 1, by the thermoplastic resin packed into the lower part side of the cavity 1c of the mold 1 earlier. Subsequently, as a fourth step, the thermoplastic resin is packed into the remaining part of the cavity 1c of the mold 1. Further, as a fifth step, the pins are withdrawn successively from the pin 3 located on the lower part side of the mold 1, before the thermoplastic resin packed within the cavity 1c cools down to a temperature at which it solidifies and loses its flowability. In this case, the withdrawal of the pins 3 at the fifth step is sometimes started during the fourth step, depending upon the packing quantity and rate, etc. of the thermoplastic resin.

A state which has been withdrawn from within the mold 1 after the lapse of a subsequent given cooling time period is a molded object with the embedded member 5 shown in FIG. 1. The molded object with the embedded member 5 thus produced is such that, with the member to-be-embedded shown as a coiled member in FIGS. 2 and 3, the outer periphery of the coiled member is covered with the thermoplastic resin 6 at a given thickness. In addition, after the withdrawal of the pins 3, an insulating member such as silicone rubber (not shown) is packed, whereby further enhancement in an insulating property can be achieved.

As described above, the thermoplastic resin 6 is packed into the mold 1 from the lower part side of the member to-be-embedded 2 so as to press the member to-be-embedded 2 against the pin 3 located at the upper part side of the mold 1, and the pins are withdrawn successively from the pin 3 located at the lower part side of the mold 1, before the thermoplastic resin 6 cools down to the temperature at which it solidifies and loses its flowability, whereby the support of the member to-be-embedded 2 can be easily done. In this case, the member to-be-embedded 2 is pressed upward by the thermoplastic resin 6 packed under the given pressure into the lower part side of the member to-be-embedded 2, so that even when the pins 3 are withdrawn before the solidification of the thermoplastic resin, the member to-be-embedded 2 can be prevented from moving in a gravitational direction.

Although the coiled member has been described as the member to-be-embedded 2 in Embodiment 1, a similar advantage can be expected for an electric device different from the coiled member, or any other device.

Embodiment 2

In Embodiment 1, it has been described that the thermoplastic resin is packed from the gate 1d into the mold 1 on the lower part side of the member to-be-embedded 2 earlier, so as to press the member to-be-embedded 2 against the pin 3 located on the upper part side of the mold 1, by the thermoplastic resin 6, and that the pins are withdrawn successively from the pin 3 located on the lower part side of the mold 1, before the thermoplastic resin 6 cools down to the temperature at which it solidifies and loses its flowability. Embodiment 2 may well be so configured that, as shown in a sectional view of essential portions in FIG. 6, the temperatures of the thermoplastic resin 6 in the vicinities of the pins 3 are sensed by temperature sensors 7, such as thermocouples, located in the vicinities of the individual pins 3 within the mold 1. More specifically, the thermoplastic resin 6 is packed in a state where the member to-be-embedded 2 is held within the mold 1 with the pins 3, as shown in FIGS. 4 and 5, the temperatures of the thermoplastic resin 6 in the vicinities of the individual pins 3 are sensed by the temperature sensors 7 located in the vicinities of the individual pins 3, and the pins 3 are withdrawn successively from the pin 3 in the vicinity of the temperature sensor 7 having sensed a value near the temperature at which the thermoplastic resin 6 solidifies and loses its flowability, whereby the pins 3 can be withdrawn at good timings in accordance with the lowering of the temperatures of the thermoplastic resin 6.

Further, a similar advantage can be expected even when, as another example, the temperatures of the thermoplastic resin 6 in the vicinities of the individual pins 3 are sensed by locating temperature sensors 8, such as thermocouples, on the pins 3 as in a sectional view of essential portions shown in FIG. 7.

Figure 1:
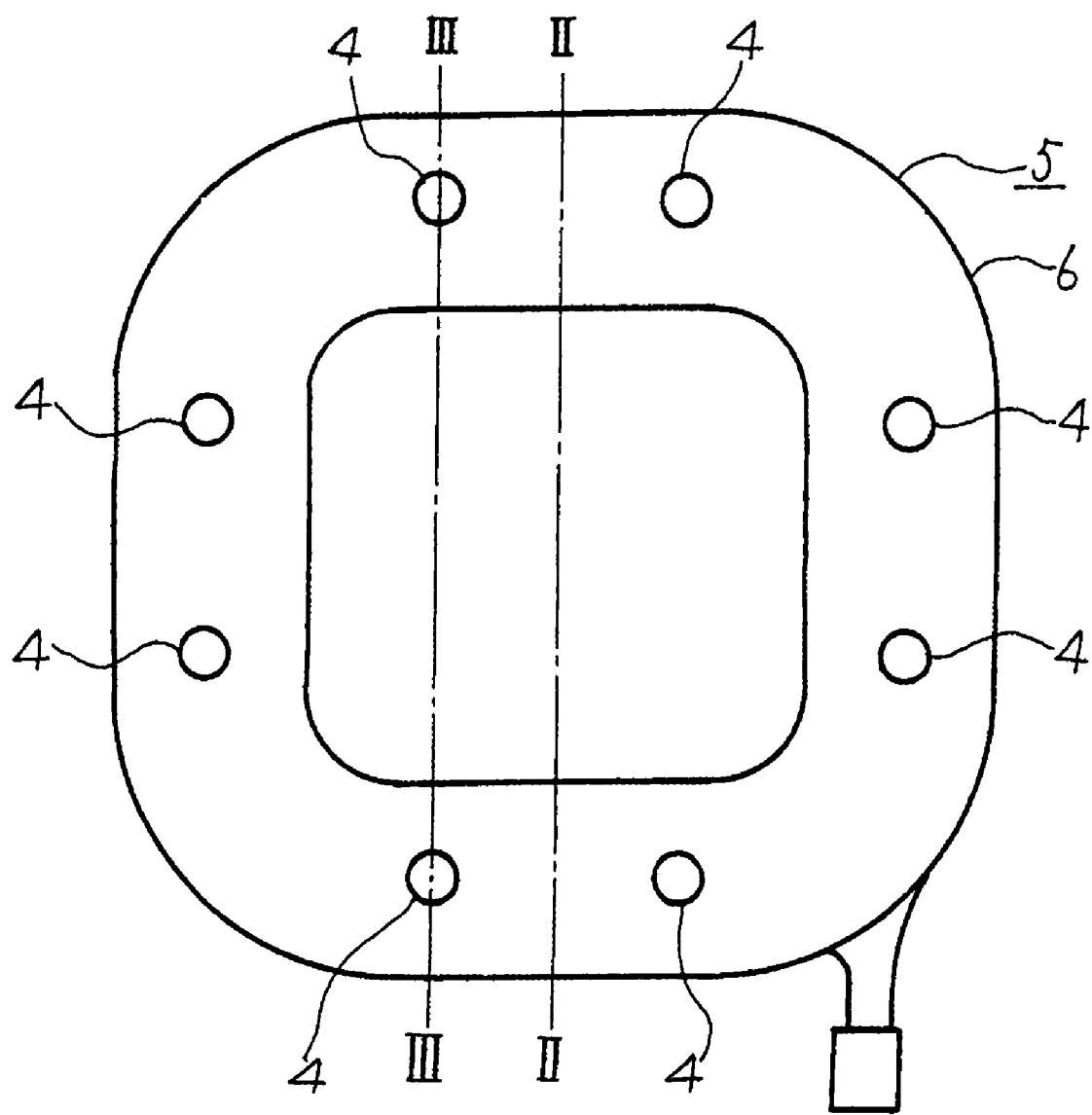
[FIG. 1] It is a plan view showing a molded object with an embedded member produced by Embodiment 1 of this invention.
Figure 2:
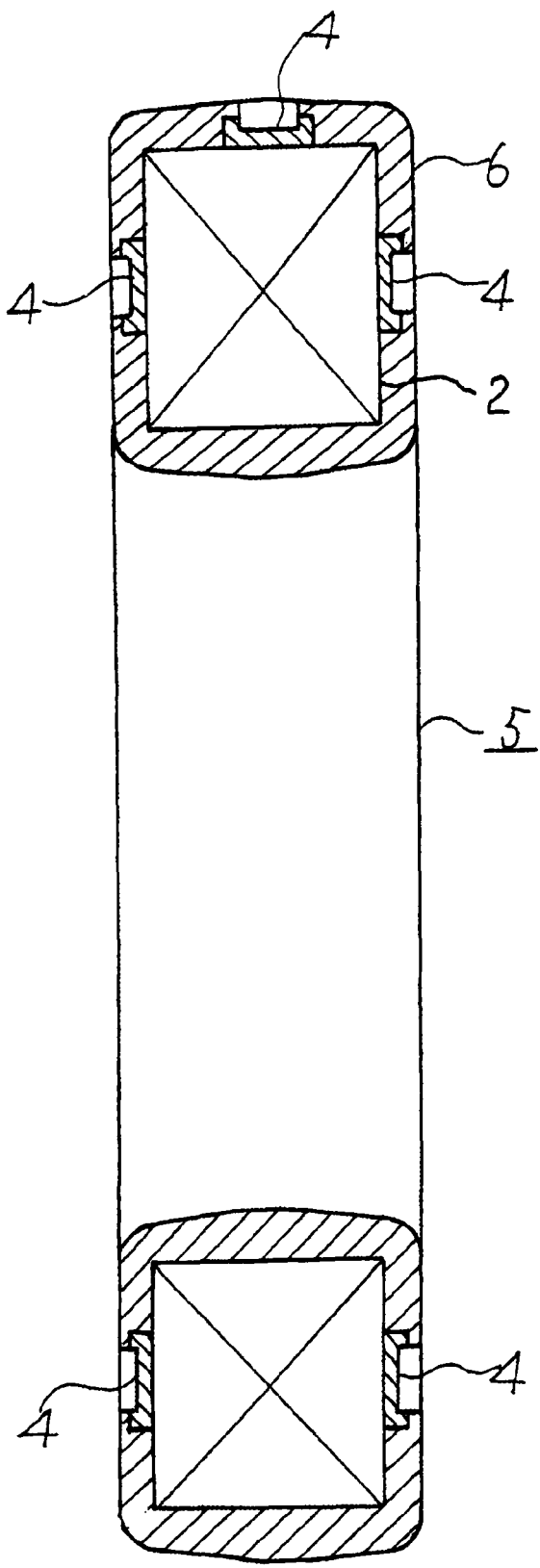
[FIG. 2] It is a sectional view taken along line II-II in FIG. 1.
Figure 3:
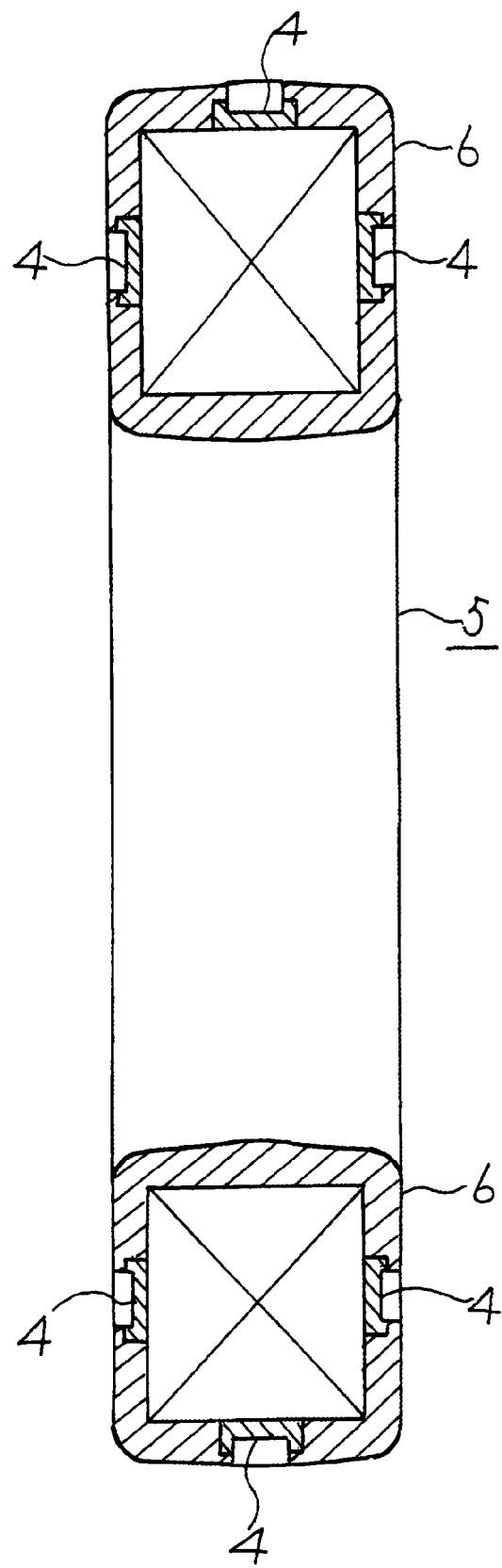
[FIG. 3] It is a sectional view taken along line III-III in FIG. 1.
Figure 4:
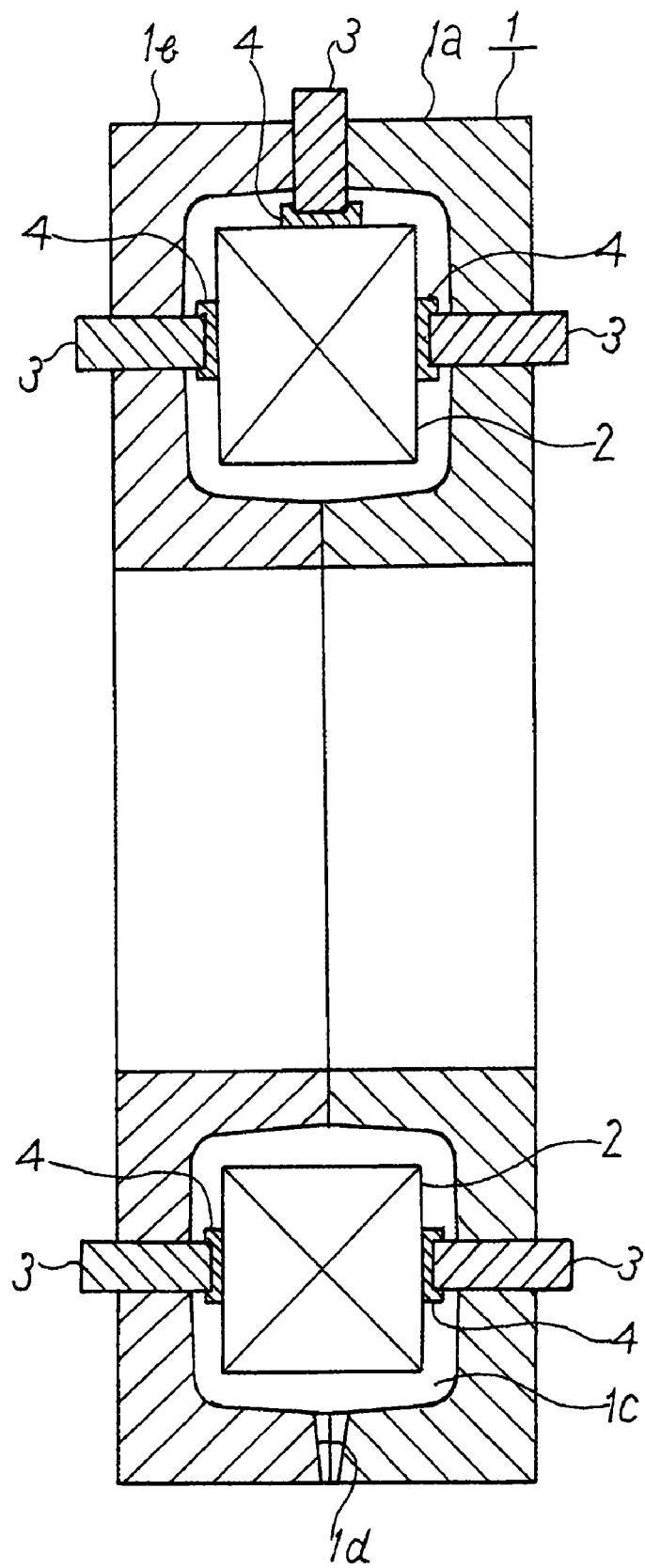
[FIG. 4] It is an explanatory view showing the internal state of a mold at a part which corresponds to the section of the line II-II in FIG. 1.
Figure 5:
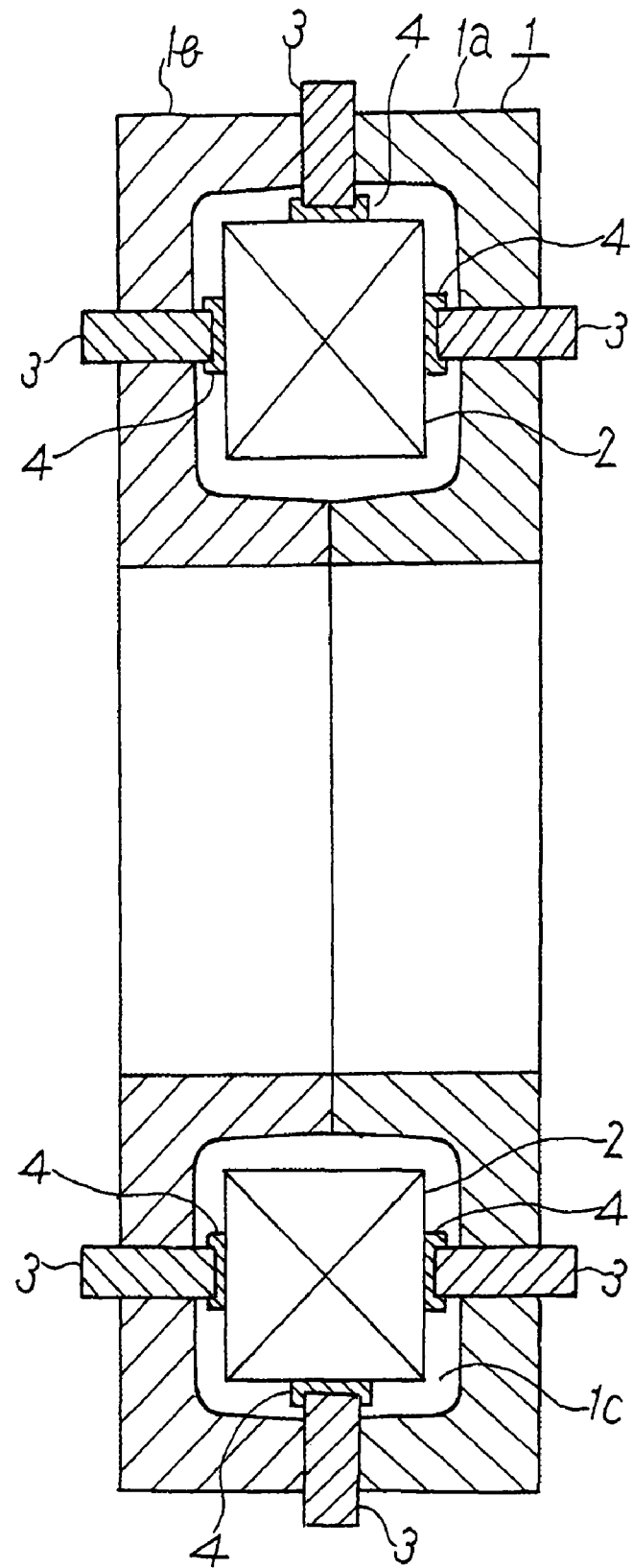
[FIG. 5] It is an explanatory view showing the internal state of the mold at a part which corresponds to the section of the line III-III in FIG. 1.
Figure 6:
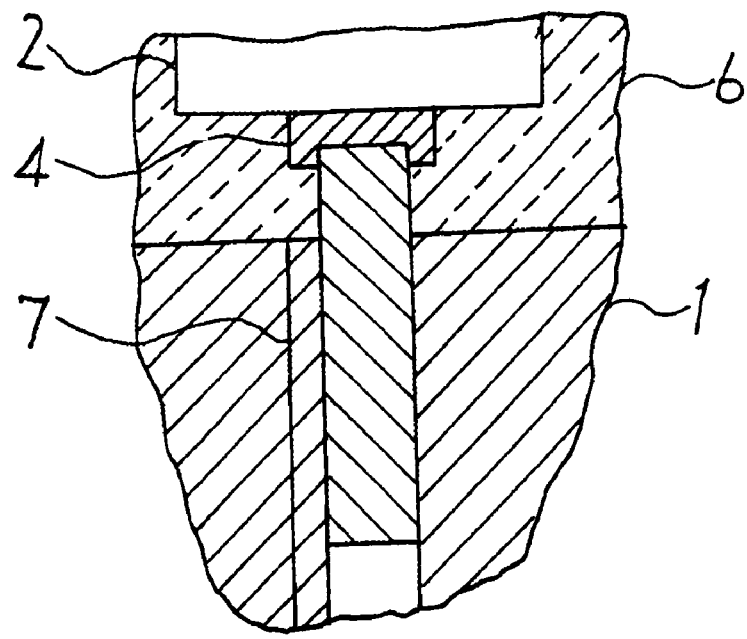
[FIG. 6] It is a sectional view of essential portions, showing an example of temperature detection means for a thermoplastic resin in Embodiment 2 of this invention.
Figure 7:
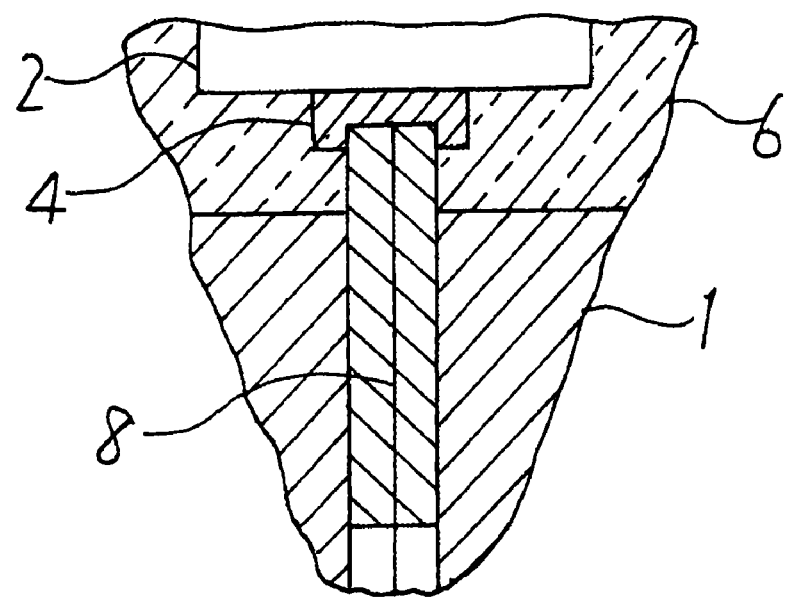
[FIG. 7] It is a sectional view of essential portions, showing another example of the temperature detection means for the thermoplastic resin in Embodiment 2.

DESCRIPTION OF REFERENCE NUMERALS AND SIGNS 1 mold, 1d gate, 2 member to be embedded, pin, 4 protector, 5 molded object with embedded member, 6 thermoplastic resin, 7, 8 temperature sensors.

The invention claimed is:

1. A process for producing a molded object with an embedded member, comprising a first step of heating to a given temperature, a mold which is formed with a gate capable of packing a thermoplastic resin therethrough, and in which a plurality of pins extending from the outside to the inside of the mold are withdrawable outward; a second step of supporting a member to-be-embedded which is embedded in the thermoplastic resin, including an upper part side thereof, with the pins, so as to hold the member to-be-embedded at a given position within the mold; a third step of packing the thermoplastic resin in a pressurized state from the gate into the mold, wherein initially introduced resin enters the mold in an upward direction against a downwardly facing side of the member to-be-embedded, so that the upwardly flowing resin exerts an upward force on the member to-be-embedded and causes the member to-be-embedded to be pressed upwardly against the pin on an upper part side of the mold; a fourth step of packing the thermoplastic resin into the remaining part within the mold; and a fifth step of withdrawing the pins successively from a lower part side of the mold, before the thermoplastic resin cools down to a temperature at which it solidifies and loses its flowability, said fifth step started during the fourth step, so gravitational movement of the member to-be-embedded is opposed by the upward force of the pressurized thermoplastic resin being packed into the remaining part within the mold.

2. A process for producing a molded object with an embedded member, comprising a first step of heating to a given temperature, a mold which is formed with a gate capable of packing a thermoplastic resin therethrough, and in which a plurality of pins extending from the outside to the inside of the mold are withdrawable outward; a second step of supporting a member to-be-embedded which is embedded in the thermoplastic resin, with the pins, so as to hold the member to-be-embedded at a given position within the mold; a third step of packing the thermoplastic resin from the gate into the mold; and a fourth step of sensing temperatures of the thermoplastic resin in vicinities of the individual pins, with temperature sensors, and then withdrawing the pins successively from the mold in response to a respective temperature sensor having detected a temperature value near a temperature at which the thermoplastic resin solidifies and loses its flowability.

3. A process for producing a molded object with an embedded member as defined in claim 1, characterized in that protectors formed of insulating members are located between the member to-be-embedded and the pins.

4. A process for producing a molded object with an embedded member as defined in claim 2, characterized in that protectors formed of insulating members are located between the member to-be-embedded and the pins.

5. A process for producing a molded object with an embedded member, comprising a first step of heating to a given temperature, a mold which is formed with a gate capable of packing a thermoplastic resin therethrough, and in which a plurality of pins extending from the outside to the inside of the mold are withdrawable outward; a second step of supporting a member to-be-embedded which is embedded in the thermoplastic resin, including an upper part side thereof, with the pins, so as to hold the member to-be-embedded at a given position within the mold, wherein there are disposed, between the member to-be-embedded and the plurality of pins, protectors that are formed of an insulating material and have recesses into which respective ones of the plurality of pins are inserted, and the member to-be-embedded is held with the plurality of pins by the intermediary of the protectors;

a third step of packing the thermoplastic resin from the gate into the mold, wherein initially introduced resin enters a bottom of the mold and engages a downwardly facing lowermost side of the member to-be-embedded, said lowermost side disposed at a bottom of the mold so that upwardly flowing resin in the mold presses the member to-be-embedded against the pin on an upper side of the mold, with the thermoplastic resin; a fourth step of packing the thermoplastic resin into the remaining part within the mold; and a fifth step of withdrawing the pins successively from a lower part side of the mold, before the thermoplastic resin cools down to a temperature at which it solidifies and loses its flowability.

6. The process according to claim 5, wherein the protectors remain in the solidified resin following the fifth step.

7. A process for producing a molded object with an embedded member, comprising a first step of heating to a given temperature, a mold which is formed with a gate capable of packing a thermoplastic resin therethrough, and in which a plurality of pins extending from the outside to the inside of the mold are withdrawable outward; a second step of supporting a member to-be-embedded which is embedded in the thermoplastic resin, with the pins, so as to hold the member to-be-embedded at a given position within the mold, wherein there are disposed, between the member to-be-embedded and the plurality of pins, protectors that are formed of an insulating material and have recesses into which respective ones of the plurality of pins are inserted, and the member to-be-embedded is held with the plurality of pins by the intermediary of the protectors; a third step of packing the thermoplastic resin from the gate into the mold; and a fourth step of sensing temperatures of the thermoplastic resin in vicinities of the individual pins, with temperature sensors, and then withdrawing the pins successively from the pin in a vicinity of the temperature sensor having detected a value near a temperature at which the thermoplastic resin solidifies and loses its flowability.

8. The process according to claim 7, wherein the protectors remain in the solidified resin following withdrawal of the pins.

* * * * *